United States Patent [19]
Nakayama et al.

[11] Patent Number: 5,865,418
[45] Date of Patent: Feb. 2, 1999

[54] FLOW CONTROL VALVE

[75] Inventors: Satoshi Nakayama, Hirakata; Yoshie Watari, Osaka; Takahiro Kurihara, Shijonawate, all of Japan

[73] Assignee: Matsushita Electric Works, Ltd., Osaka, Japan

[21] Appl. No.: 964,827

[22] Filed: Nov. 5, 1997

[30] Foreign Application Priority Data

Nov. 8, 1996 [JP] Japan .................................. 8-296163
Sep. 22, 1997 [JP] Japan .................................. 9-256857

[51] Int. Cl.⁶ .................................................. F16K 31/02
[52] U.S. Cl. .............................................. 251/11; 60/528
[58] Field of Search .............................. 251/11; 60/527, 60/528

[56] References Cited

U.S. PATENT DOCUMENTS

| 3,974,844 | 8/1976 | Pimentel | 251/11 X |
| 4,750,520 | 6/1988 | Heim et al. | 251/11 X |
| 4,973,024 | 11/1990 | Homma . | |
| 5,211,371 | 5/1993 | Coffee | 251/11 |
| 5,345,963 | 9/1994 | Dietiker . | |

FOREIGN PATENT DOCUMENTS 61-103081 5/1986 Japan .
2-8573 1/1990 Japan .

*Primary Examiner*—Kevin Lee
*Attorney, Agent, or Firm*—Nikaido, Marmelstein, Murray & Oram LLP

[57] ABSTRACT

A compact fluid control valve effects a reliable fluid flow regulation by the use of a shape memory alloy wire. The valve comprises a barrel provided with a base member and a valve body. The valve body is cooperative with the base member to define therebetween a valve opening in the course of an internal flow path through the valve for a fluid. The valve body is movable towards and away from the base member to vary the valve opening for regulating the flow of the fluid. A bias spring urges the valve body for varying the valve opening in one direction. The shape memory alloy wire connects the valve body to the barrel to move the valve body against the bias spring for varying the valve opening when heated. The barrel has anchor members for securing the ends of the wire. The anchor members are disposed on the exterior of the barrel and at such a portion that the wire stretches between the barrel and the valve body exteriorly of the barrel in an overlapping relation with a major portion of the barrel along the axial length thereof. Thus, the wire can be kept substantially away from the internal flow path of the fluid and consequently kept thermally unaffected thereby for a reliable flow regulation. Further, since the wire overlaps with the barrel, the entire valve can have a reduced axial dimension and be therefore made compact enough to be installed in a limited space.

15 Claims, 13 Drawing Sheets

FLOW CONTROL VALVE

BACKGROUND OF THE INVENTION

1. Fields of the Invention

The present invention is directed to a flow control valve, and more particularly to such a valve utilizing a shape memory alloy wire for varying a valve opening for regulation of a fluid flow.

2. Description of the Prior Art

U.S. Pat. No. 4,973,024 and Japanese Laid-Open Publication (KOKAI) No. 2-8573 disclose prior art flow control valves using a shape memory alloy wire for regulating a fluid flow. The valve comprises a barrel with an axial bore, a valve seat in the axial bore, and a valve body axially movable within the bore relative to the valve seat to vary a valve opening formed between the valve body and the valve seat. Formed within the barrel is an internal flow path extending from an inlet to an outlet through the valve opening. The shape memory alloy wire bridges between the valve body and the barrel and is connected to an electrical source in order to be heated in a controlled manner, undergoing thermal deformation along its length. The deformation or varying length of the wire causes the valve body to move against a spring bias in a direction of increasing or decreasing the valve opening for regulation of the fluid flow. In this known valve, the wire extends within the axial bore of the barrel with its opposite ends connected respectively to the valve body and the barrel and therefore must be connected to the electric source by way of the valve body as well as the barrel. Thus, the valve body and the barrel are required to be made of an electrically conductive material, which reduces design flexibility. In addition, the valve body and the barrel might form an additional electrical path other than through wire or might fail to establish a constant electrical path only through the wire not influenced by the movement of the valve body. In this event, the wire could be heated in an uncontrolled manner so as to result in a failure of reliably regulating the fluid flow. Further, since the wire extends through the internal fluid path, the wire will be thermally affected by the fluid passing through the path so that the wire suffers from unintended thermal deformation, which eventually leads to unreliable regulation of the fluid flow.

These problems could be eliminated in a flow control valve proposed in Japanese Laid-Open Publication (KOKAI) No. 61-103081. The valve comprises a barrel with an axial bore, a valve seat fixed in the axial bore, and a valve body axially movable within the barrel to vary a valve opening defined between the valve body and the valve seat. The barrel is formed with an inlet and an outlet which are communicated through the valve opening to establish an internal flow path within the barrel. A like shape memory alloy wire is provided for connection of the valve body to the barrel in order to vary the valve opening in response to a controlled heating of the wire. In this valve, the wire is wound round a portion of the valve body and is physically fixed at its opposite ends to the barrel, while the wire is electrically connected to an electrical source through terminals at the opposite ends of the wire. Thus, the wire can be directly connected to the electrical source without passing through the valve body and the barrel, thereby assuring reliable control of regulating the fluid flow by the use of the wire. However, there still remains a problem that the wire winding round the valve body within the axial bore adds an extra axial length to a structure of the valve body and the valve seat arranged axially along the barrel, which is a hindrance to give a fully-compacted design to the flow control valve using the shape memory alloy wire. This size problem becomes more critical as the length of the wire is required to be greater for obtaining an increased amount of linear deformation of the wire available for the control of the valve opening.

SUMMARY OF THE INVENTION

In view of the above problems, the present invention has been achieved to provide an improved fluid control valve which could be made compact, while retaining a reliable fluid flow regulation by the use of a shape memory alloy wire. The fluid control valve in accordance with the present invention comprises a barrel having an axial bore within which an internal flow path for a fluid is formed to extend from an inlet to an outlet. A base member is disposed at one axial end of the barrel, while a valve body is held in the other axial end of the barrel. The valve body is cooperative with the base member to define therebetween a valve opening in the course of the internal flow path. The valve body is axially movable towards and away from the base member to vary the valve opening for regulating the flow of the fluid through the internal flow path. A bias spring is provided to urge the valve body for varying the valve opening in one direction. At least one shape memory alloy wire connects the valve body to the barrel to exert, in response to thermal deformation of the wire, a force of moving the valve body against the bias spring to vary the valve opening. The wire is formed on its opposite ends with terminals by which the wire is connected to an electrical source for heating the wire to give the thermal deformation. The barrel is provided with at least one anchor member for engaging with one end of the wire and the valve body is provided with at least one catch member for engaging with other end of the wire. The anchor member is disposed on the exterior of the barrel and at such a portion that the wire stretches between the barrel and the valve body exteriorly of the barrel in an overlapping relation with a major portion of the barrel along the axial length thereof. Because of the above spatial arrangement of the anchor member, the wire can be kept substantially away from the internal flow path formed within the barrel. Whereby, the wire has a less chance of being exposed to the fluid flow and consequently a less chance of being thermally affected by the fluid flow so as to give a reliable regulation of the fluid flow based upon a controlled thermal linear deformation of the wire. Further, since the wire overlaps with the major portion of the barrel along the axial length thereof, the entire valve can have a reduced axial dimension and be therefore made compact enough to be installed in a limited space.

Accordingly, it is a primary object of the present invention to provide a flow control valve which is capable of realizing a reliable regulation of the fluid flow and at the same time of being made compact.

In a preferred embodiment of the present invention, the barrel is provided with a pair of the anchor members for securing the opposite ends of the wire, and the valve body is provided with a pair of the catch members. The wire is wound round the catch members with the opposite ends of the wire fixed to the anchor members. Thus, the wire can stretch over the valve body in an elongated length to give a correspondingly increased amount of linear deformation within a limited axial length of the barrel, thereby giving an increased range of movement of the valve body per a limited temperature variation range.

It is therefore another object of the present invention to provide a flow control valve which is capable of giving a wide range of controlling the valve opening in relation to a limited temperature variation range.

The catch members is formed of a different material from the valve body and is selected to have a thermal conductivity less than that of the valve body. The catch members project from the valve body so that the wire wound around the catch members is kept spaced from the valve body. Thus, the wire is prevented from the leakage of the heat developed in the wire to the valve body, assuring a consistent control of thermally deforming the wire for reliable regulation of the fluid flow.

Preferably, the base member is threadedly engaged with the barrel in order to vary an axial position of the base member relative to the valve body for adjusting the valve opening.

A seal ring is attached to the valve body and comes into tight contact with the base member to close the valve opening when the valve body moves close to the base member, thereby closing the valve opening successfully.

In a preferred embodiment, the barrel is formed with a pair of wire guides in addition to the anchor members so that the wire is wound round the guides as well as the catch members to extend around the barrel and the valve body by one complete turn. Thus, the wire can stretch in an elongated length for increasing the range of linear deformation of the wire and therefore the range of varying the valve opening even with the valve of the limited axial length.

A plurality of turnaround members may be formed on the valve body in addition to the anchor member so that the wire passes round the turnaround members between the opposite ends thereof. The turnaround members are spaced circumferentially around the barrel. With this result, the wire can be folded plural times in such manner as to stretch axially and circumferentially of the barrel for elongating the length of the wire to give a maximum range of linear deformation to the wire.

Further, the barrel may be formed with a retainer extension which receives therearound the coil spring embodying the bias spring in such a manner as to isolate the coil spring from the base member threadedly engaged with the barrel. The coil spring thus isolated from the base member is therefore kept intact from the axial movement of the base member, thereby ensuring an easy adjustment of the valve opening without varying a biasing force of spring.

The barrel may be formed in its outer surface with a groove for passing therethrough the wire in order to protect the wire within the barrel for reliable regulation of the fluid flow by the wire.

Further, the barrel may include a protective extension which extends axially outwardly beyond the valve body for avoiding the valve body from interfering with surroundings.

The valve may include a stopper for limiting a rotation of the valve body relative to the barrel about an axis of the barrel in order to prevent the wire from being twisted or warped during the repeated movement of the valve body, therefore ensuring a consistent flow control over a long period of use.

In addition, the valve may also include a restrictor which restricts the axial movement of the valve body relative to the base member within a predetermined range in order to prevent unduly high stress applied to the wire which would otherwise occur when the valve body is moved away from the base member beyond a certain limit under the urgence of the bias spring. Thus, the wire is protected from undergoing permanent deformation due to such high stress applied in the absence of the restrictor.

Preferably, the outlet is formed in the valve body and opens to the exterior of the valve body at a portion staggered with the wire passing over the valve body. The outlet communicates with the valve opening through an axial path formed between the valve body and the barrel. Thus, the wire can be intact from the fluid being discharged outward through the outlet and can be therefore prevented from thermally affected by the fluid flow.

These and still other objects and advantageous features of the present invention will become more apparent from the following description of the preferred embodiments when taken in conjunction with the attached drawings.

DETAILED DESCRIPTION OF THE EMBODIMENTS

A fluid control valve of the present invention is utilized in a device, for example, a blood pressure monitoring device to discharge an air from an occluding cuff at a controlled rate for determination of a systolic and diastolic pressure.

Figure 1:
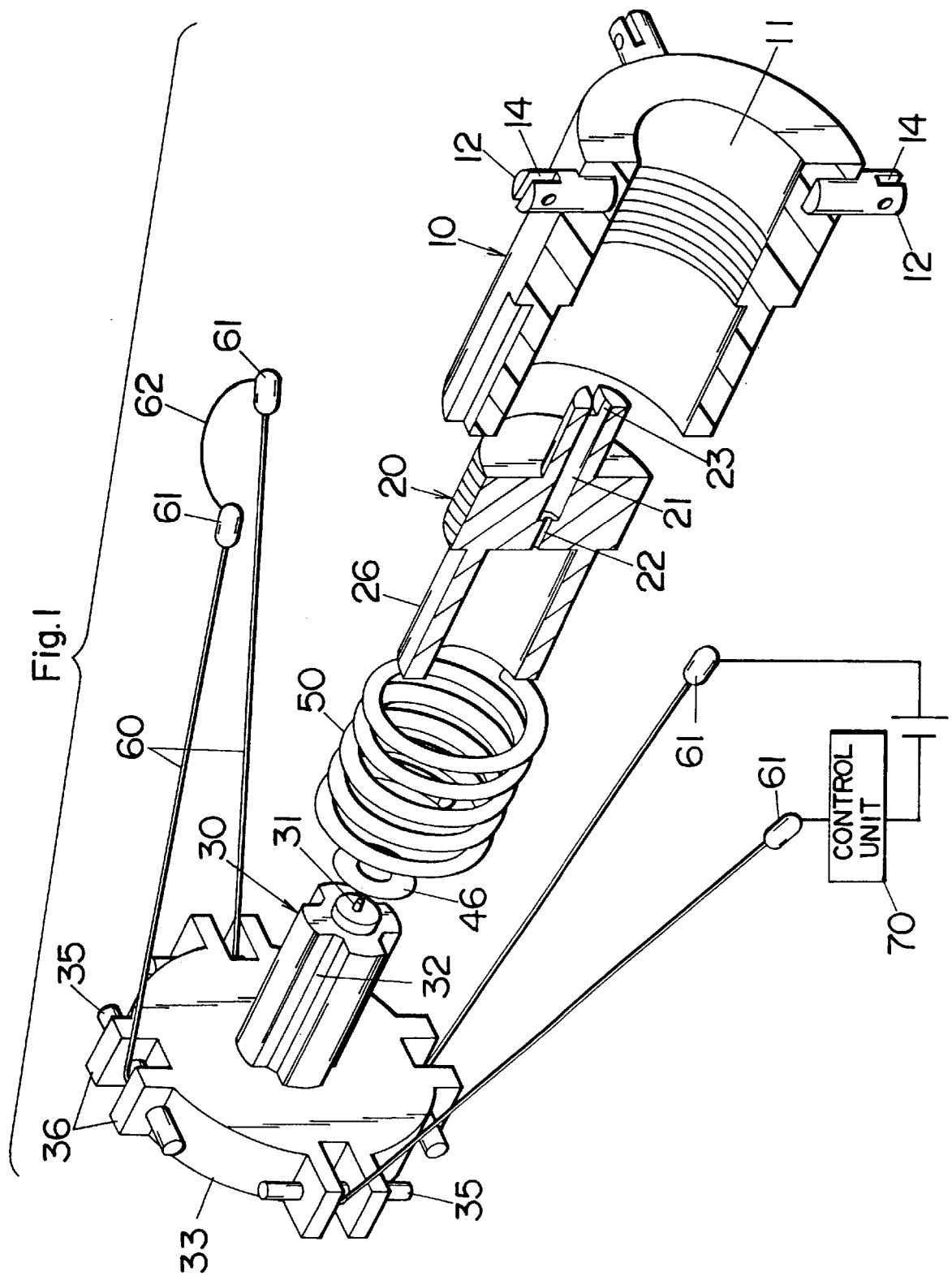
FIG. 1 is an exploded perspective view of a flow control valve in accordance with a first embodiment of the present invention.
Figure 2:
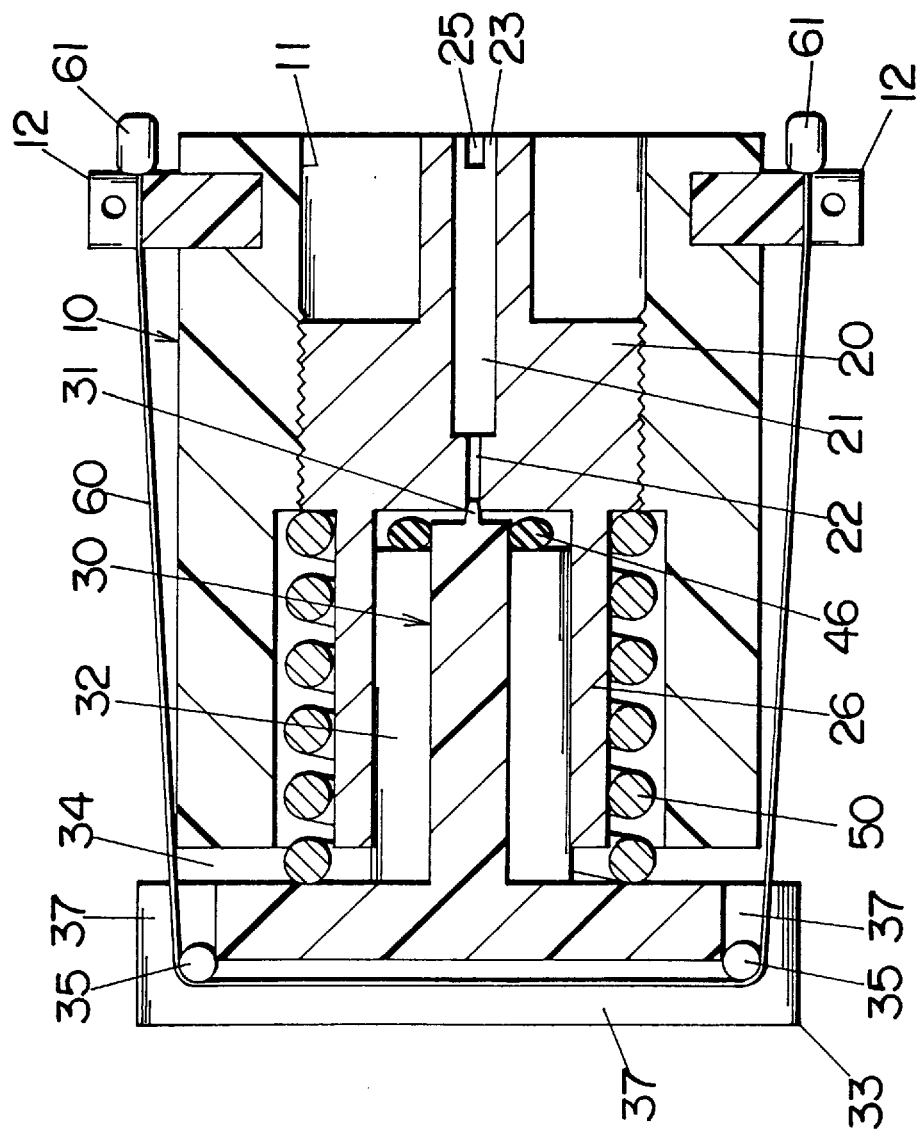
FIG. 2 is a sectional view of the valve of FIG. 1.

First Embodiment <FIGS. 1 and 2>

Referring to FIGS. 1 and 2, there is shown a flow control valve in accordance with a first embodiment of the present invention. The valve comprises a barrel 10 of an electrical insulative plastic material having an axial bore 11, a base member 20 in one end of an axial bore 11, and a valve body 30 slidably fitted in the other end of the axial bore. The base member 20 is threadedly engaged with the interior of the barrel 10 to be capable of adjusting its axial position within the barrel 10, and is formed integrally with a conduit 21 and a retainer extension 26 extending axially in opposite directions with each other. An orifice 22 is formed centrally in the base member 20 and communicates with an inlet 23 formed at the outer end of the conduit 21. The conduit 21 is formed at its outer end with a slit 25 which is adapted in use to receive a tool, i.e. a tip of a screwdriver for the axial adjustment of the base member 20.

The valve body 30 is in the form of a shaft slidably received within a retainer extension 26 and is formed on its inner axial end with a stem 31 which projects into the orifice 22 of the base member 20 to define, between the stem and the base member, a valve opening which varies in response to the axial movement of the valve body 30 relative to the base member 20. The valve body 30 is formed in its outer surface with a set of circumferentially spaced and axially elongated slits 32 which extend from the valve opening to an outlet 34 formed between an end plate 33 and the adjacent end of the barrel 10. Thus, an internal flow path is formed to extend from the inlet 23 at the outer axial end of the base member 20 through the valve opening to the outlet 34. The valve member 30 is molded from an electrically insulative plastic material to integrally include the end plate 33 having a diameter greater than the axial bore 11. A seal ring 46 is fitted around a foot of the stem 31 so as to comes into a tight contact with a valve seat formed on an inner axial end of the base member 20 around the periphery of the orifice 22, when the valve body 30 moves close to the base member 20, thereby providing a completely valve closed condition.

A coil spring 50 is fitted around the retainer extension 26 as being compressed between the base member 20 and the end plate 33 of the valve body 30 in order to bias the valve body 30 away from the base member 20, i.e., in a direction of increasing the valve opening for an increased fluid flow through the flow path. In this sense, the valve is of a normally open type. The valve body 30 is connected to the barrel 10 by means of wires 60 tightly stretched therebetween. The wire is made of a shape memory alloy which has an original length and is deformed to have a greater length so that it recovers to the original length when heated. That is, the wire 60 will shrink when heated to thereby move the valve body 30 inward against the bias of the spring 50 in a direction of closing the valve opening. The shape memory alloy is made of, for example, Ti-Ni, Ti-Ni-Cu, or Ti-Ni-Co. As best shown in FIG. 2, each of the wires 60 is secured at its opposite ends to a pair of anchor members 12 mounted on the barrel 10 at one axial end adjacent the base member 20 and spaced circumferentially by 180°, and is wound round a pair of diametrically opposed catch members 35 formed at the periphery of the end plate 33 of the valve body 30. The anchor member 12 is in the form of a stud with a slit 14 in which the end of the wire 60 is fitted and is staked therein. In addition, the wire 60 is formed at its opposite ends with terminals 61 for connection to an electrical source through a control unit 70. The two wires 60 are connected in series by way of a conductor 62 across the electrical source to flow a current in a controlled amount by the control unit 70.

The control unit 70 includes a PWM controller to vary a duty ratio of an electric current being fed to the wire 60 in order to control an amount of Joule heat evolved in the wire and therefore a corresponding amount of linear deformation of the wire for varying the valve opening, i.e., the flow amount of the fluid through the valve. In this embodiment, the valve is controlled to decrease the flow amount continuously to the entirely closed condition.

Each of the catch members 35 is in the form of a pin extending between a pair of brackets 36 integrally formed with the end plate 33 and is made of a material having less thermal conductivity than the valve body 30 as well as having low coefficient of friction, for minimizing the heat transfer from the wire to the valve body as well as achieving smooth engagement of the wire with the valve body. The end plate 33 is formed in its outer surface with grooves 37 each communicating at its opposite ends to a concavity in which the pins 35 extend between the brackets 36, so that each wire 60 passes through the grooves 37 in such a manner as to be protected from contacting the surroundings, in addition to being out of contact relation with the end plate 33.

It is noted here that the base member 20 may be molded integrally with the barrel 10 to be a fixed member with respect to the barrel.

Figure 3:
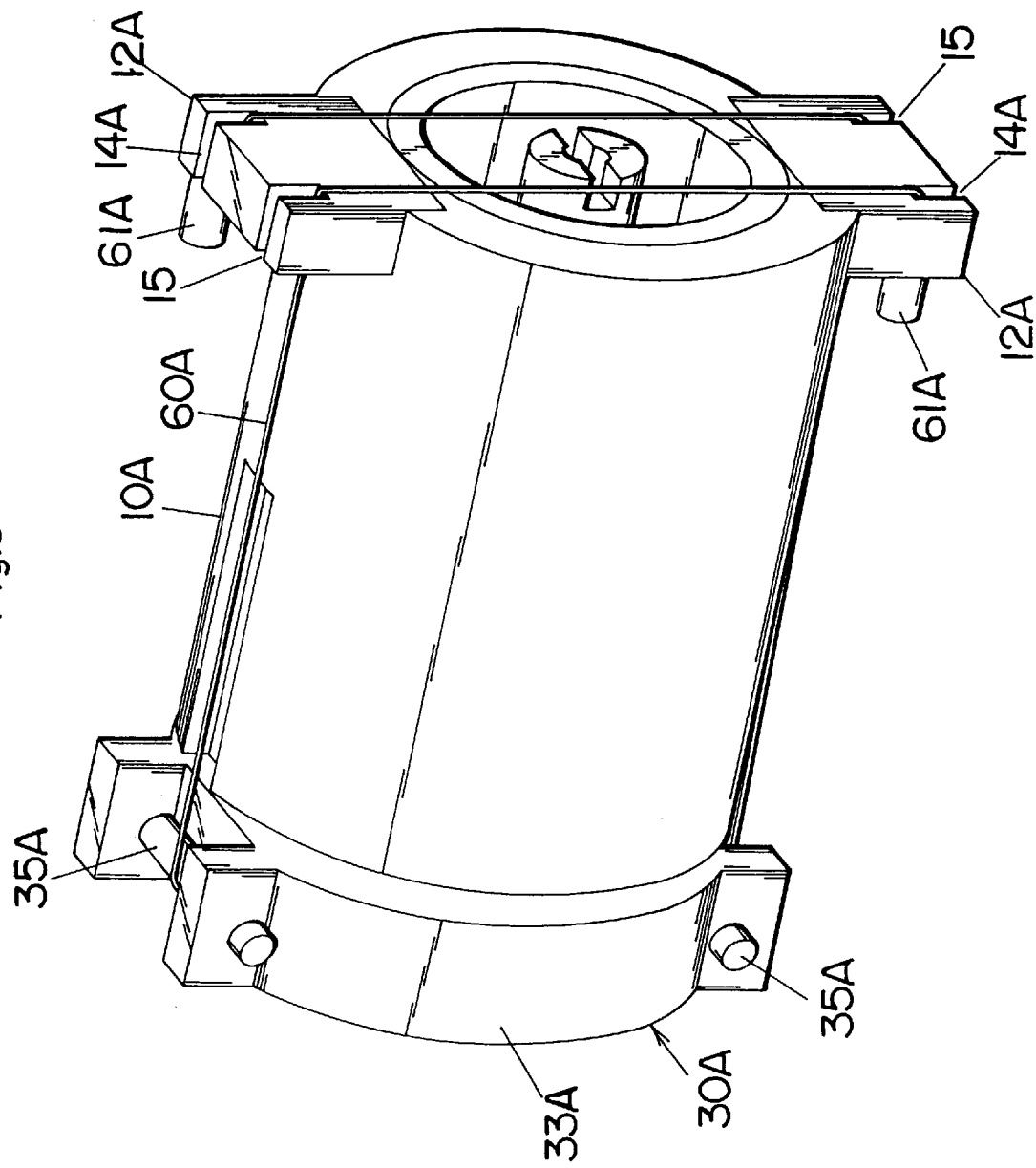
FIG. 3 is a perspective view of a flow control valve in accordance with a second embodiment of the present invention.

Second Embodiment <FIG. 3>

FIG. 3 illustrates a fluid control valve in accordance with a second embodiment of the present invention which is similar in construction and operation to the first embodiment except that a single wire 60A is employed to move the valve body 30A. Like parts are designated by like numerals with a suffix letter of "A". The barrel 10A is formed at its one axial end with a pair of diametrically spaced anchor members 12A each having two slits, one being an anchor slit 14A for securing the end of the wire and the other being a guide slit 15 for passing the wire therethrough. The end plate 33A of the valve body is formed with a corresponding set of diametrically spaced catch members 35A in the form of pins. The single wire 60A winds round the pins 35A and also the guide slits 15 so as to stretch around the barrel 10A and the valve body by one complete turn. Thus, the wire can stretch in an elongated length over the valve to give a corresponding increase amount of thermal deformation available for movement of the valve body.

Figure 4:
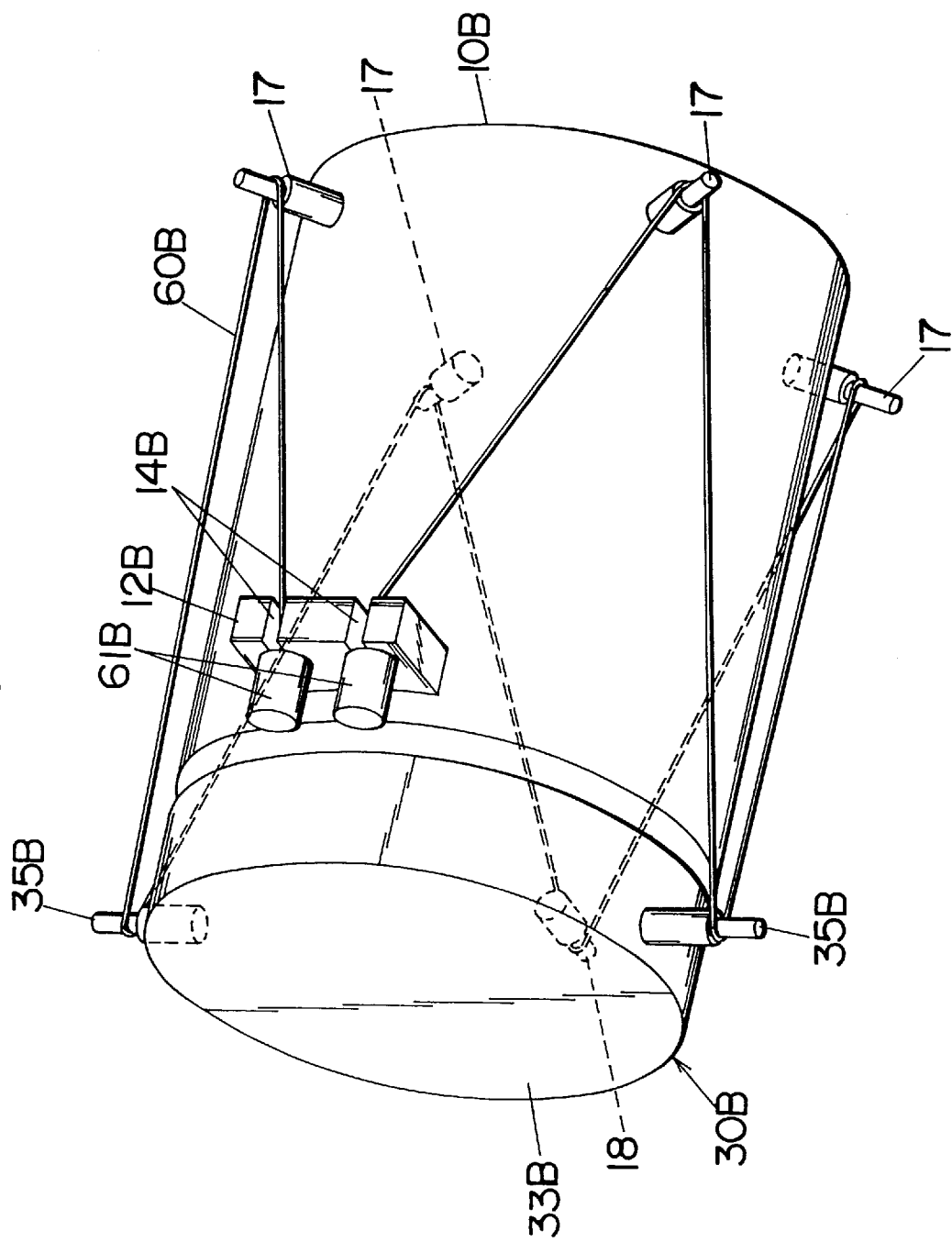
FIG. 4 is a perspective view of a flow control valve in accordance with a third embodiment of the present invention.
Figure 5:
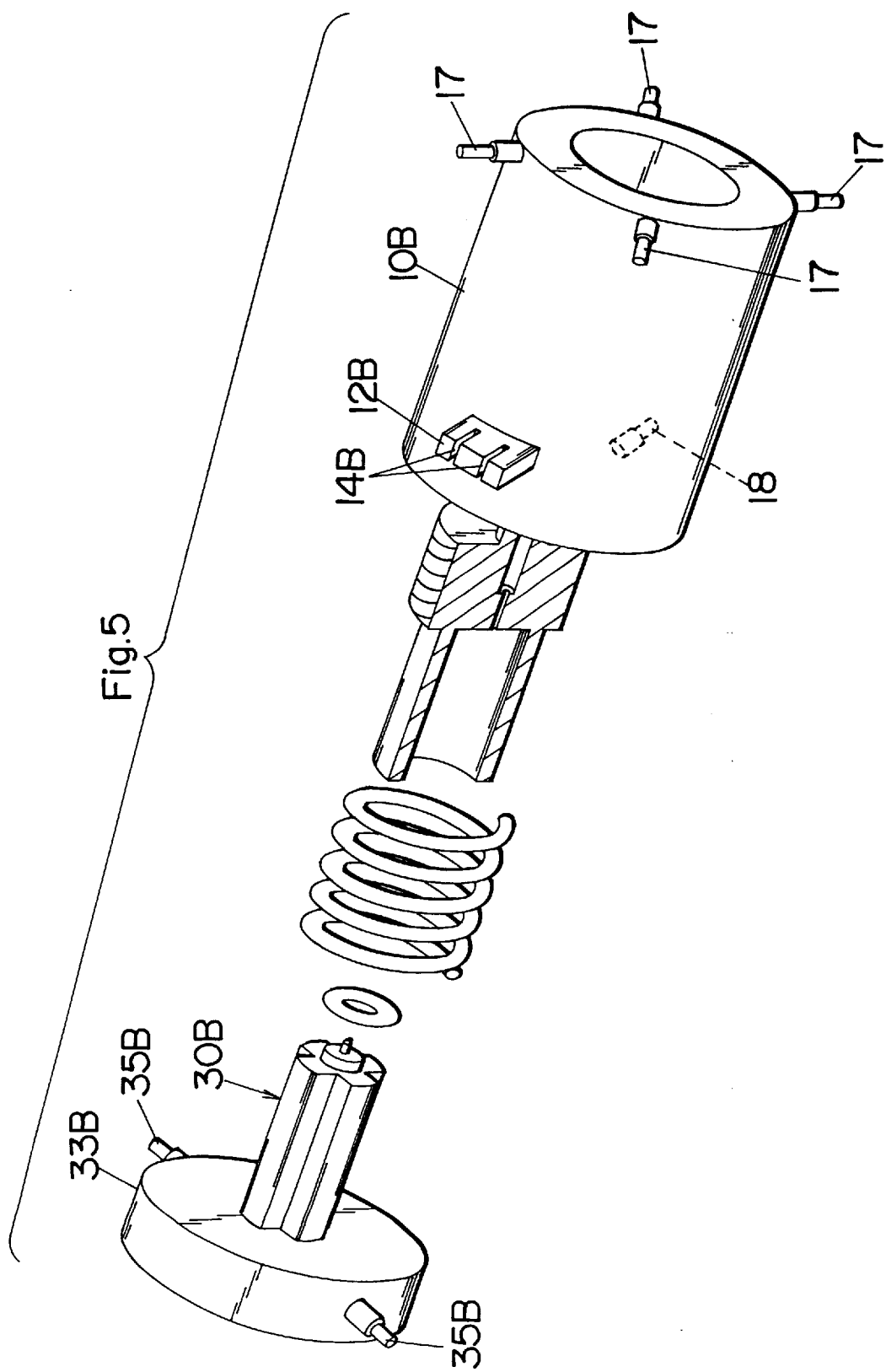
FIG. 5 is an exploded perspective view of the valve of FIG. 4.

Third Embodiment <FIGS. 4 and 5>

FIGS. 4 and 5 illustrate a fluid control valve in accordance with a third embodiment of the present invention which is similar to the second embodiment except that the single wire 60B is folded several times to extend circumferentially around the barrel 10B while stretching between the barrel 10B and the valve body 30B. Like parts are designated by like numerals with a suffix letter of "B". The anchor member 12B having two slits 14B is provided on the barrel 10B at one axial end adjacent to the end plate 33B of the valve body 30B for securing the opposite ends of the wire 60B at the respective slits 14B. In addition, the barrel 10B is formed with four main turnaround pins 17 at the axial end away from the end plate 33B and with one auxiliary turnaround pin 18 at the other axial end adjacent the end plate 33B and diametrically opposite of the anchor member 12B. The end plate 33B is formed with a pair of catch members in the form of pins 35B which are diametrically opposed to each other and are angularly spaced by 90° about the axis of the barrel from the anchor member 12B and the pin 18. Thus, the wire 60B winds round the pins 35B of the end plate 33B as well as the turnaround pins 17 and 18 with the opposite ends fixed to the anchor member 12B. With this result, the wire can stretch between the barrel and the valve body in an elongated length to thereby give a correspondingly increased amount of linear deformation of the wire available for controlling the valve opening.

Figure 6:
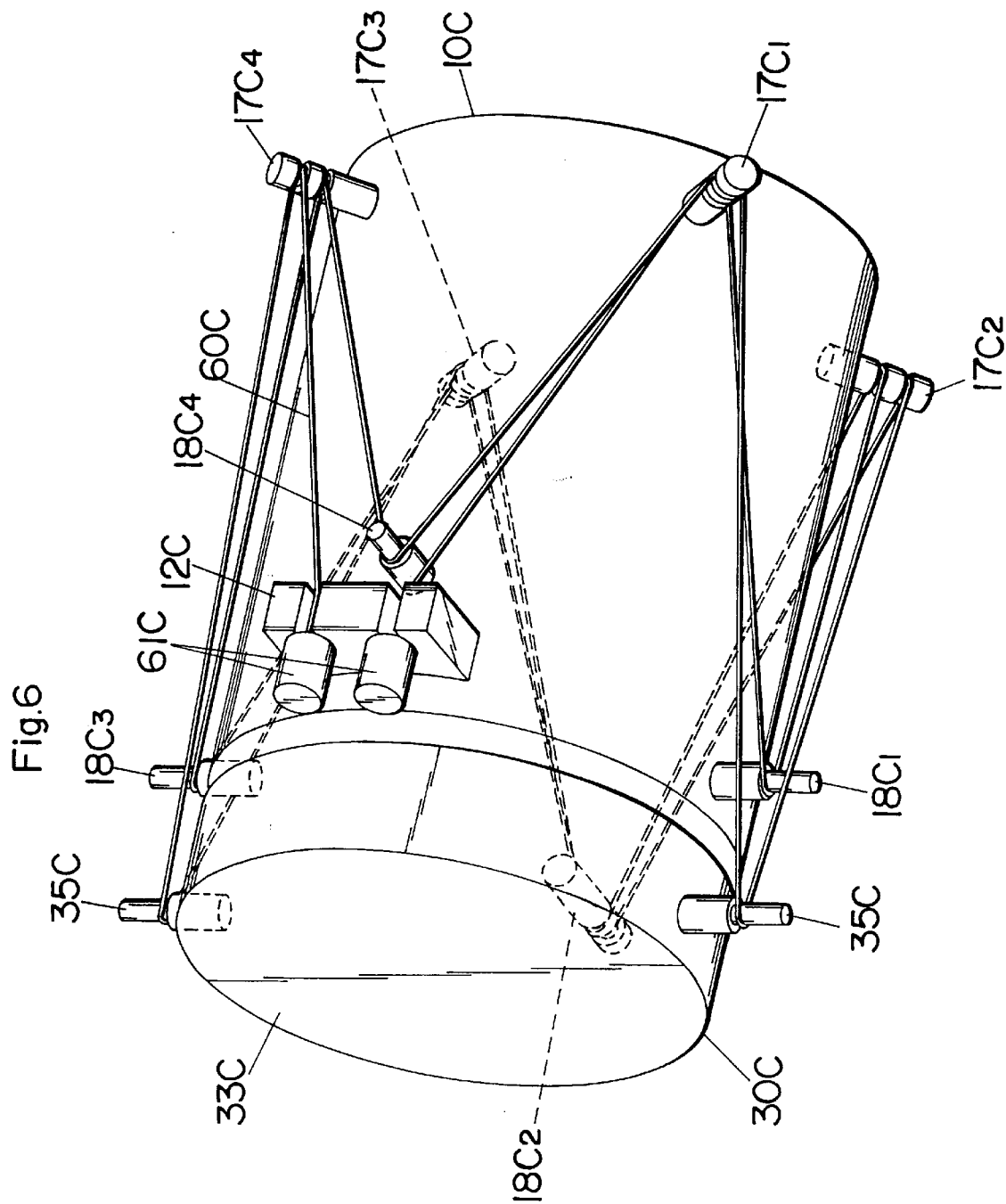
FIG. 6 is a perspective view of a flow control valve in accordance with a fourth embodiment of the present invention.

Fourth Embodiment <FIG. 6>

FIG. 6 illustrates a fluid control valve in accordance with a fourth embodiment of the present invention which is similar to the third embodiment except that the single wire 60C extends doubly around the barrel 10C. Like parts are designated by like numerals with a suffix letter of "C". The barrel 10C is formed with four main turnaround pins 17C projecting at one axial end away from the end plate 33C of the valve body 30C and evenly spaced circumferentially around the barrel 10C and also with four auxiliary turnaround pins 18C projecting at the other axial end adjacent the end plate 33C and evenly spaced circumferentially around the barrel. All of the main turnaround pins 17C and one auxiliary turnaround pin 18C are formed respectively with double-channels each passing the wire 60C therethrough. The remaining three of the auxiliary turnaround pin 18C is formed only with a single channel and are referred to as single-channel pins. Thus, the wire 60C starting from the anchor member 12C passes through in the order of the inner channel of a first main pin 17C1, the first single-channel auxiliary pin 18C1, inner channel of the second main pin 17C2, inner channel of the second auxiliary pin 18C2, inner channel of the third main pin 17C3, the third single-channel auxiliary pin 18C3, inner channel of the fourth main pin 17C4, the fourth single-channel auxiliary pin 18C4, then the outer channel of the first main pin 17C1, the catch member 35C of the end plate 33C, outer channel of the second main pin 17C2, outer channel of the second auxiliary pin 18C2, outer channel of the third main pin 17C3, catch member 35C of the end plate 33C, and the outer channel of the fourth main pin 17C4, and returns to the anchor member 12C. With this elongated route, the wire 60C is given a further increased amount of the linear expansion available for moving the valve body 30C, thereby enhancing response sensitivity of the valve opening relative to a limited range of the controlled temperature range for heating the wire.

Figure 7:
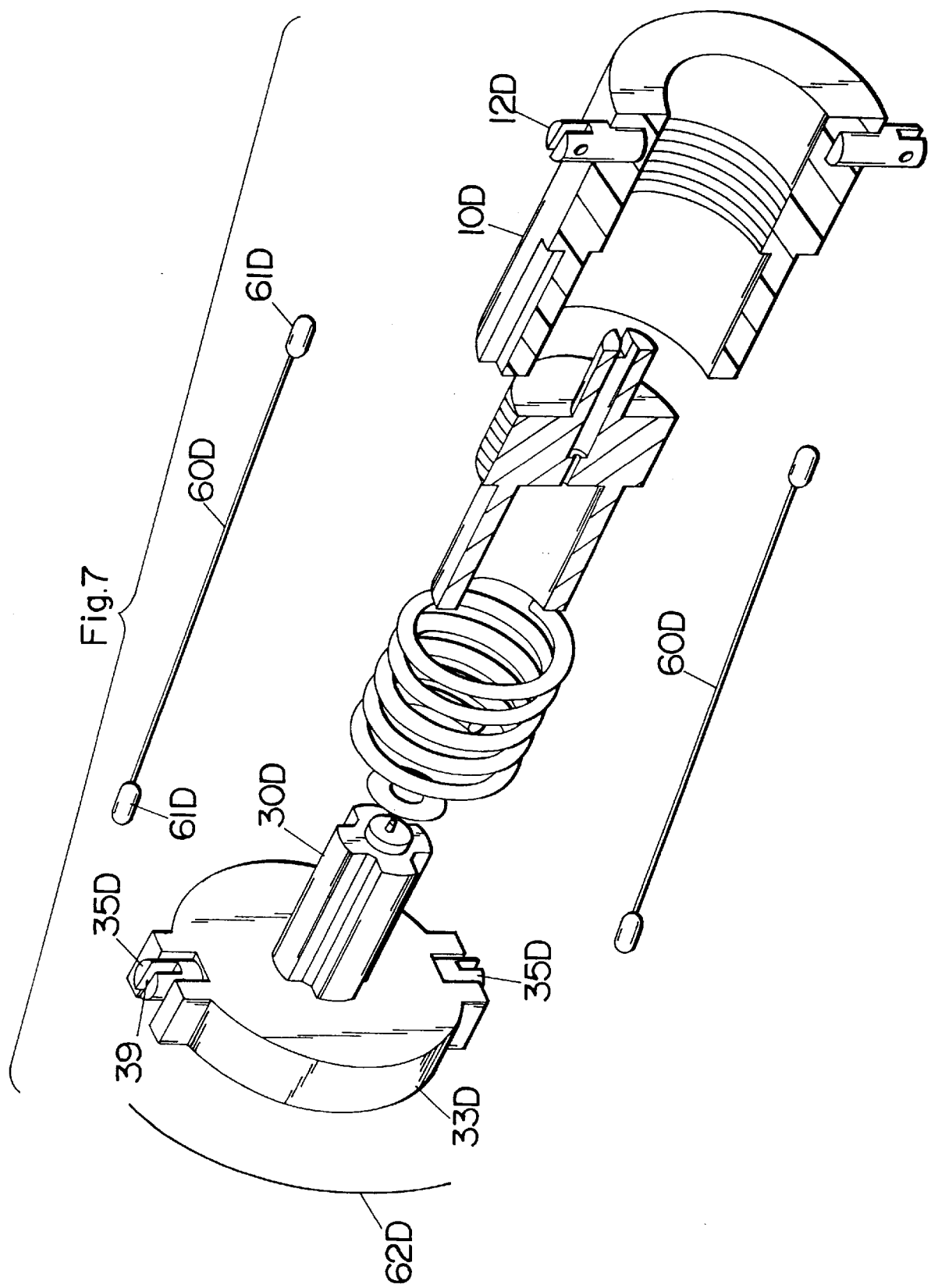
FIG. 7 is an exploded perspective view of a flow control valve in accordance with a fifth embodiment of the present invention.
Figure 8:
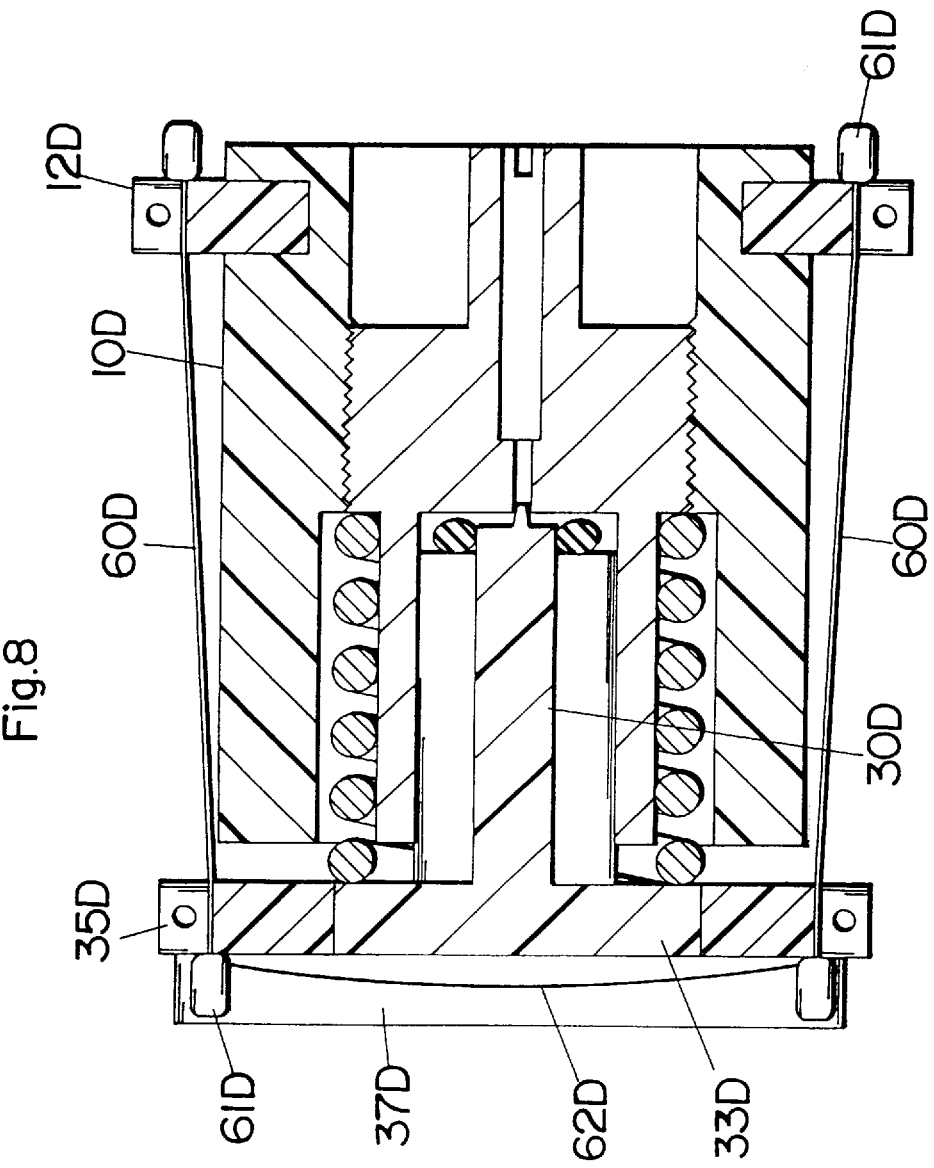
FIG. 8 is a sectional view of the valve of FIG. 7.

Fifth Embodiment <FIGS. 7 and 8>

FIGS. 7 and 8 illustrate a fluid control valve in accordance with a fourth embodiment of the present invention which is similar to the first embodiment except that two wires 60D are utilized to connect the barrel 10D and the valve body 30D at the opposite ends of each wire. Like parts are designated by like numerals with a suffix letter of "D". To this end, the end plate 33D of the valve body 30D is formed with the catch members 35D each in the form of the stud with a slit 39 for securing the one end of each wire 60D. Each wire 60D is formed at its opposite ends with terminals 61D, one for connection with the electrical source through the like control unit and the other for series connection with the complementary wire 60D through a conductor 62D routed in a like groove 37D in the outer surface of the end plate 33D. In this embodiment and the other embodiments disclosed herein, the terminals 61D are configured to prevent the wire from disengaging from the associated anchor members 12D when the wire is caused to shrink for moving the valve body axially inward against the bias of the coil spring 50.

Figure 9:
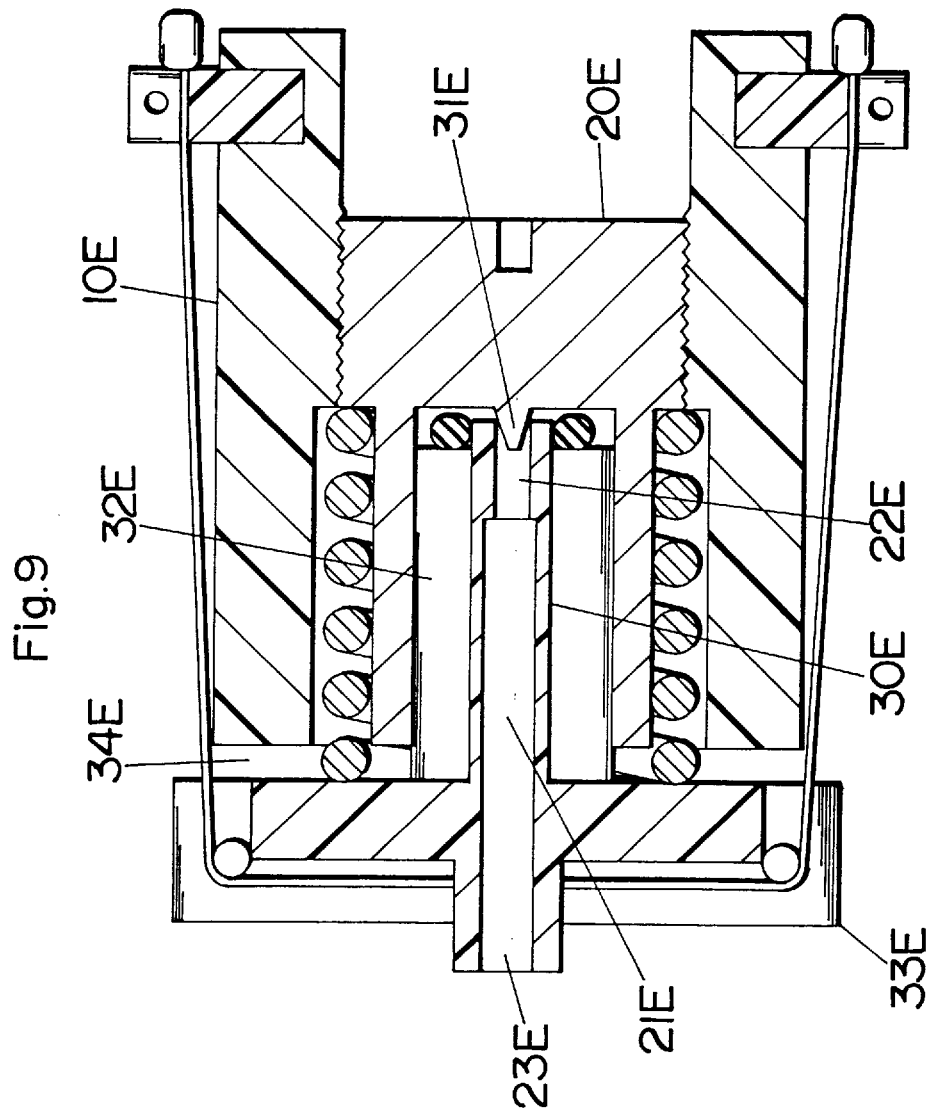
FIG. 9 is a sectional view illustrating a modification of the above fluid control valve.

Modification <FIG. 9>

FIG. 9 illustrates a modification of the first embodiment which is similar to the first embodiment except that the orifice 22E is formed in the valve body 30E rather than in the base member 20E and the stem 31E projects on the base member 20E into the orifice to define the gap opening therebetween. The orifice 22E communicates through the conduit 21E in the valve body 30E with the inlet 23E at the outer end of the end plate 33E of the valve body 30E. Thus, the internal flow path is formed from the inlet 23E through conduit 21E, orifice 22E, slit 32E in the circumference of the valve body 30E, and to an outlet 34E between the axial end of the barrel 10E and the end plate 33E. Like parts are designated by like numerals with a suffix letter of "E". Operation of the modified flow control vale is the same as that of the first embodiment and is deemed unnecessary to repeat herein.

Figure 10:
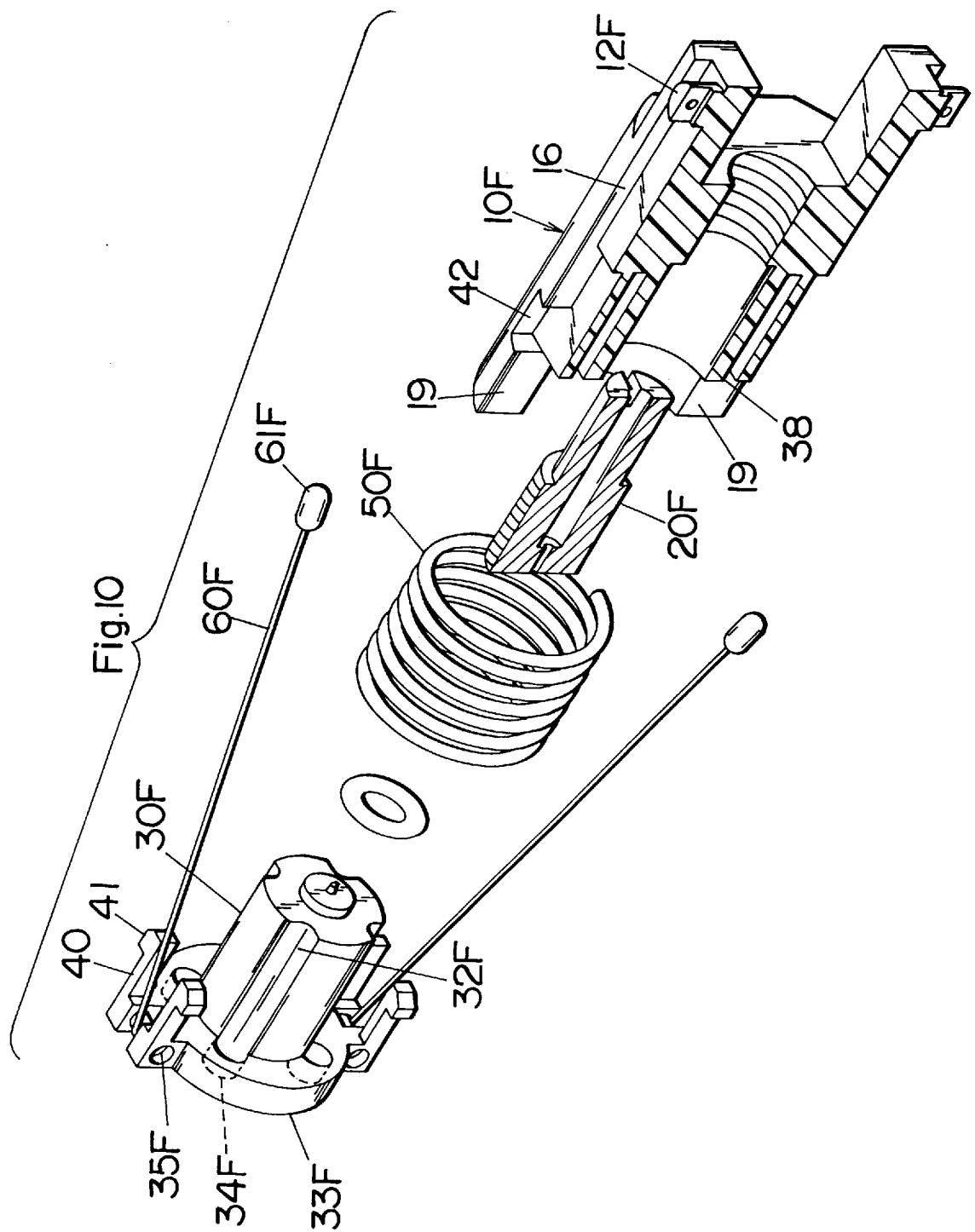
FIG. 10 is an exploded perspective view of a flow control valve in accordance with a sixth embodiment of the present invention.
Figure 11:
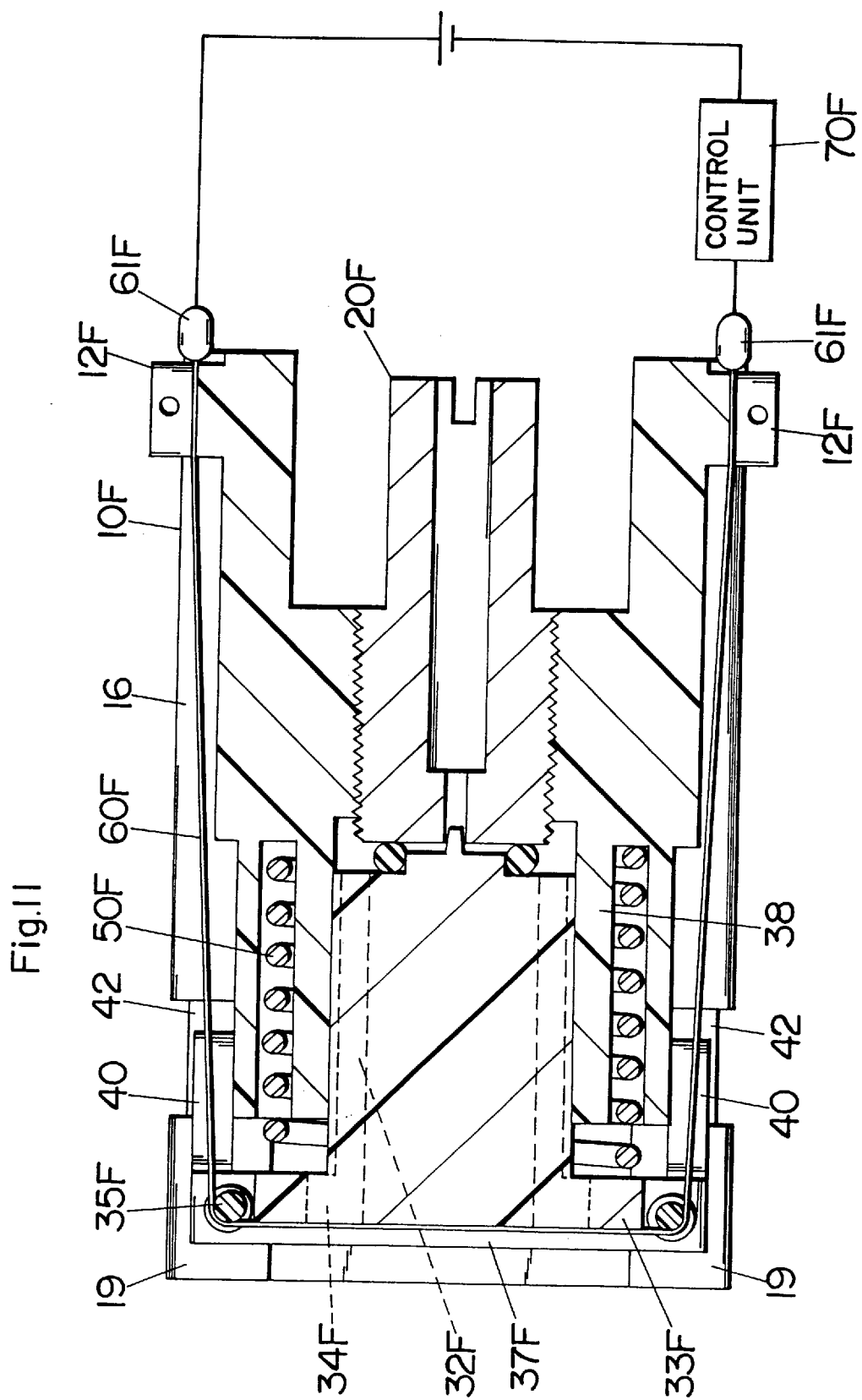
FIG. 11 is a sectional view of the valve of FIG. 10.
Figure 12:
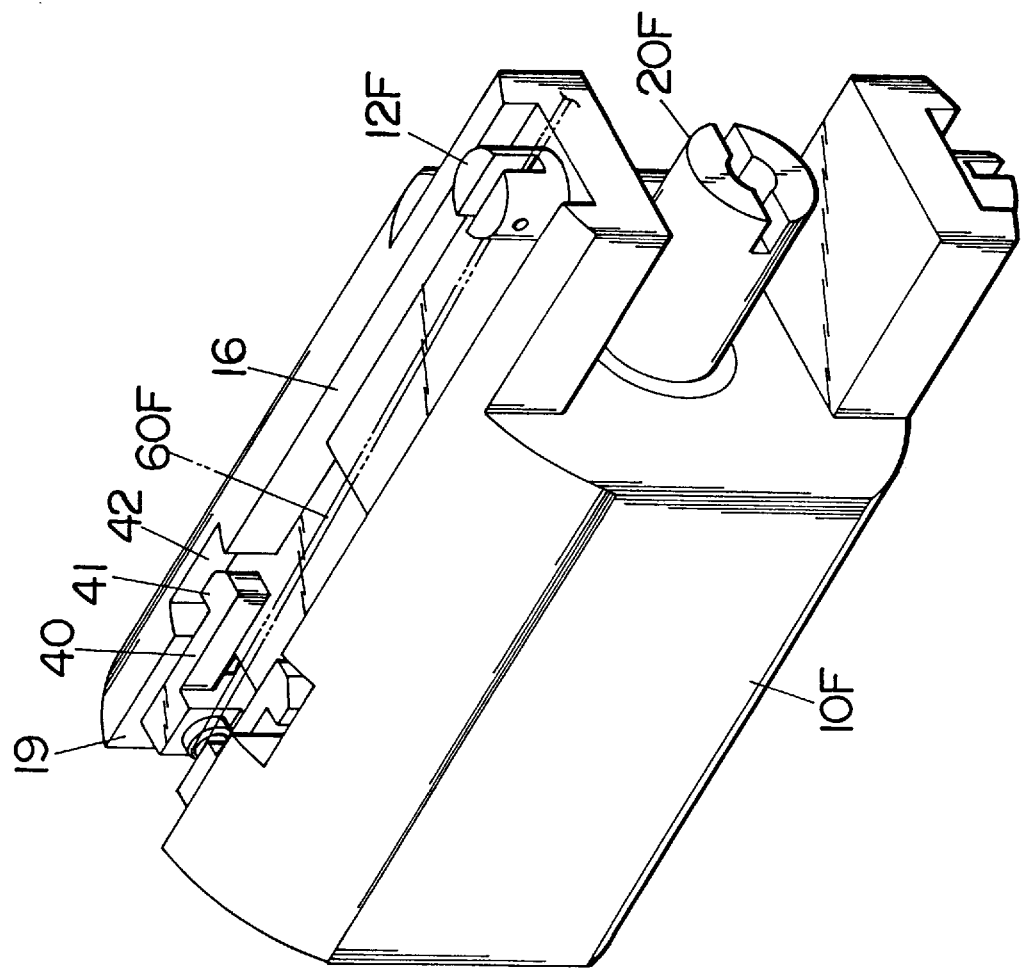
FIG. 12 is a perspective view of the valve of FIG. 10.

Sixth Embodiment <FIGS. 10 to 12>

FIGS. 10 to 12 illustrate a fluid control valve in accordance with a sixth embodiment of the present invention which is similar to the first embodiment except that the single wire 60F is employed and concealed in grooves 16 formed in the outer surface of the barrel 10F and that the barrel 10F is integrally formed with a retainer extension 38 for receiving therearound the coil spring 50F and receiving therein the valve body 30F. Like parts are designated by like numerals with a suffix letter of "F". The groove 16 extends substantially entire axial length of the barrel 10F and communicates with the groove 37F in the end plate 33F so that the wire 60F is received entirely within a concave not to interfere with external parts or components of a device in which the flow control valve is installed. The wire 60F is wound round the like catch members in the form of pins 35F on the end plate 33F with the opposite ends of the wire 60F secured to the like anchor members 12F on the barrel 10F. The wire 60F is formed at its opposite ends with the like terminals 61F for connection with the electric source through a like control unit 70F so as to heat the wire in a controlled manner for regulation of the valve opening. Further, the barrel 10F includes a protective extension 19 which extends axially beyond the end plate 33F of the valve body 30F for protecting the end plate 33F from interfering with the external parts or components of the device.

In addition, the valve body 30F includes fingers 40 which extend integrally from the end plate 33F into the groove 16 of the barrel 10F in such a manner as to prevent the valve body 30F from rotating relative to the barrel 10F about the axis thereof, thereby avoiding the otherwise warping of the wire during the repeated movement of the valve body. The fingers 40 are further formed with latches 41 which fit loosely in an axially elongated recesses 42 in the outer surface of the barrel 10F in order to restrict the axial movement of the valve body 10F. With the engagement of the latches 41 to the one axial end of the recess 42, the valve body 30F is protected from moving further axially outwardly by the urgence of the spring 50F, thereby protecting the wire from suffering undue force from the spring which would otherwise cause undesired permanent deformation to the wire. It is noted in this connection that the like fingers 40 or equivalent members may be alternately formed on the side of the barrel and are cooperative associated grooves or recess to realize the above effect of preventing the relative rotation of the valve body to the barrel and of restricting the axial movement of the valve body.

In the present embodiment, the coil spring 50F fits around the retainer extension 38 in an out of contact relation with the base member 20F, the coil spring 50F receives any external force when adjusting the axial position of the base member relative to the valve body, thereby giving a consistent biasing force not influenced from the varying position of the base member for reliable control of the valve. Further, the end plate 33F is formed with the outlets 34F which extend through the end plate in fluid communication respectively with the slits 32F in the outer surface of the valve body 30F to discharge the fluid mainly out of the outlets 34F. The outlets 34F are staggered, i.e., angularly spaced from the wire 60F passing through the groove 37F of the end plate 33F, thereby minimizing the chance of exposing the wire 60F to the fluid flow. With this result, the wire 60F is kept thermally unaffected substantially by the fluid flow to give a reliable regulation of the fluid based by the temperature control of the wire.

Figure 13:
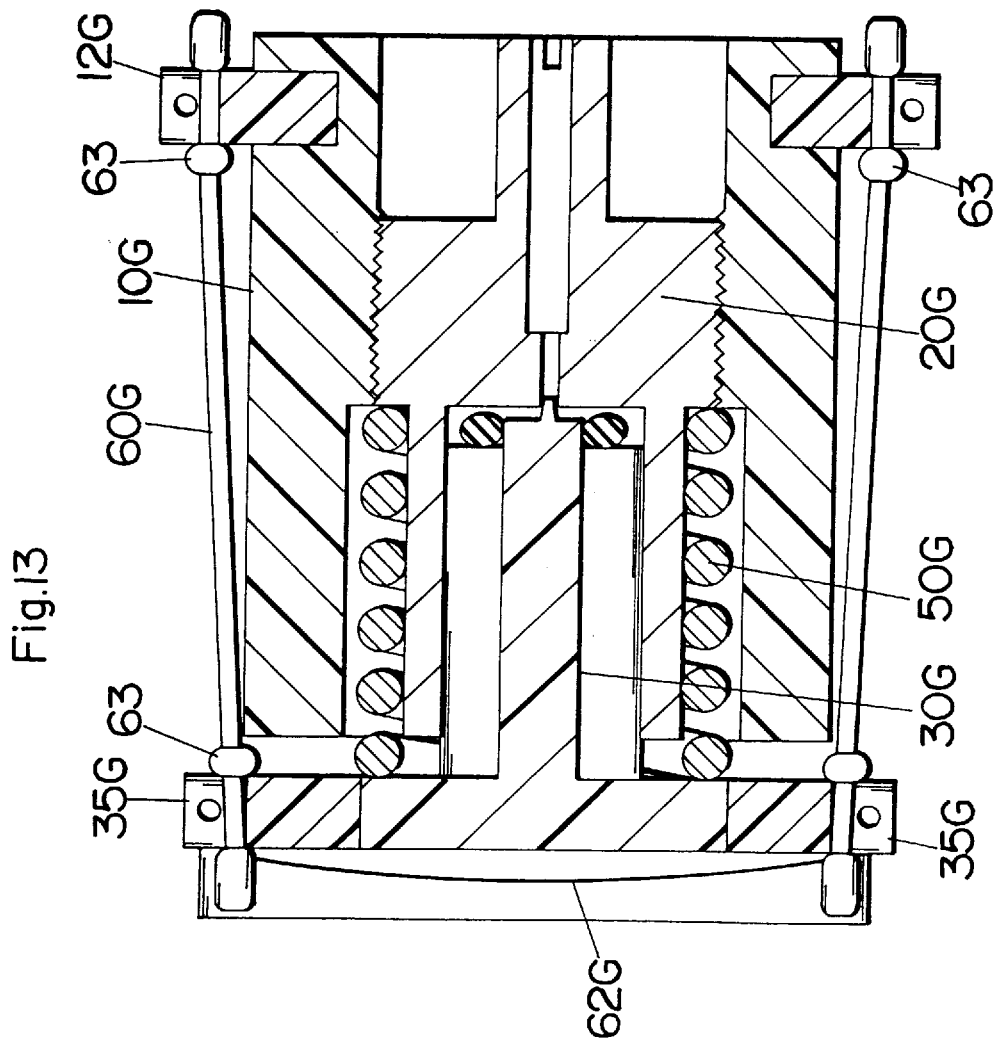
FIG. 13 is a sectional view of a fluid control valve in accordance with a seventh embodiment of the present invention.

Seventh Embodiment <FIG. 13>

FIG. 13 illustrates a fluid control valve in accordance with a seventh embodiment of the present invention which is similar to the fifth embodiment except that the wire 60G is selected to have a characteristic of expanding its length when heated and that the coil spring 50G is arranged to exert a force of pulling the valve body 30G towards the base member 20G. Like parts are designated by like numerals with a suffix letter of "G". The wire 60G stretches between the barrel 10G and the valve body 30G against the bias of the spring 50G so as to move the valve body 30G when heated to increase the valve opening, in an opposite sense to the above embodiments and modification. To this end, the wire 60G is formed at opposite ends with tension stoppers 63 at positions respectively inwardly of the anchor member 12G and the catch member 35G. The shape memory alloy wire 60G is selected to have a large diameter sufficient to achieve the above characteristics of expanding when heated. The two wires 60G are connected in series by the like conductor 62G.

What is claimed is:

1. A flow control valve assembly comprising:

a barrel having an axial bore within which an internal flow path for a fluid is formed to extend from an inlet to an outlet;

a base member disposed at one axial end of said barrel;

a valve body held in the other axial end of said barrel, said valve body being cooperative with said base member to define therebetween a valve opening in the course of said internal flow path, said valve body being axially movable towards and away from said base member to vary said valve opening for regulating the flow of the fluid through said internal flow path;

a bias spring which urges said valve body for varying said valve opening in one direction; at least one shape memory alloy wire which connects said valve body to said barrel to exert, in response to thermal deformation, a force of moving said valve body against said bias spring to vary the valve opening, said wire formed on its opposite ends with terminals by which the wire is connected to an electrical source for heating said wire to give said thermal deformation;

said barrel being provided with at least one anchor member for engaging with one end of said at least one wire;

said valve body being provided with at least one catch member for engaging with other end of said at least one wire; wherein (characterized in that) said anchor member is disposed on the exterior of said barrel and at such a portion that said wire stretches between said barrel and said valve body exteriorly of said barrel to overlap with a major portion of said barrel along the axial length of said barrel.

2. The flow control valve assembly as set forth in claim 1, wherein said barrel is provided with a pair of said anchor members for securing opposite ends of said at least one wire, said valve body provided with a pair of said catch members with respect to said at least one wire so that said wire is wound round said catch members with the opposite ends of said wire fixed to said anchor members.

3. The flow control valve assembly as set forth in claim 1, wherein said at least one wire is fixed at its opposite ends respectively with said anchor member and said catch member so as to stretch therebetween.

4. The flow control valve assembly as set forth in claim 2, wherein said catch members project from said valve body so that said wire is wound around said catch members in a spaced relation with said valve body, said catch members having a thermal conductivity less than that of said valve body.

5. The flow control valve assembly as set forth in claim 1, wherein said base member is threadedly engaged with said barrel in order to vary an axial position of the base member relative to said valve body for adjusting said valve opening.

6. The flow control valve assembly as set forth in claim 1, wherein said base member is formed with a retainer extension around which said bias spring in the form of a coil spring fits.

7. The flow control valve assembly as set forth in claim 1, wherein said valve body is provided with a seal ring which comes into tight contact with said base member to close said valve opening when said valve body moves close to said base member.

8. The flow control valve assembly as set forth in claim 2, wherein said barrel is formed with a pair of wire guides in addition to said anchor members so that said at least one wire winds round said guides as well as said catch members to extend around said barrel and said valve body by one complete turn.

9. The flow control valve assembly as set forth in claim 2, wherein said valve body is formed with a plurality of turnaround members in addition to said anchor member so that said at least one wire winds round said turnaround members between the opposite ends thereof, said turnaround members being spaced circumferentially around said barrel.

10. The flow control valve as set forth in claim 5, wherein said barrel is formed with a retainer extension which receives therearound said spring in the form of a coil spring in such a manner as to isolate said coil spring from said base member.

11. The flow control valve assembly as set forth in claim 1, wherein said barrel is formed in its outer surface with a groove for passing therethrough said wire.

12. The flow control valve assembly as set forth in claim 11, wherein said barrel includes a protective extension which extends axially beyond an axially outward end of said valve body.

13. The flow control valve assembly as set forth in claim 1, including a finger for limiting a rotation of said valve body relative to said barrel about an axis of said barrel.

14. The flow control valve assembly as set forth in claim 1, including a latch which restricts the axial movement of said valve body relative to said base member within a predetermined range.

15. The flow control valve assembly as set forth in claim 1, wherein said outlet is formed in said valve body and open to the exterior of said valve body at a portion staggered with the wire passing over said valve body, sad outlet communicating with said valve opening through an axial path formed between said valve body and said barrel.

* * * * *